United States Patent
Nothofer

(10) Patent No.: US 6,424,770 B1
(45) Date of Patent: Jul. 23, 2002

(54) OPTICAL CABLE

(75) Inventor: Klaus Nothofer, Erkrath (DE)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/478,542

(22) Filed: Jan. 6, 2000

(30) Foreign Application Priority Data

Jan. 7, 1999 (DE) .......................................... 199 00 214

(51) Int. Cl.$^7$ ................................................ G02B 6/44

(52) U.S. Cl. ........................................................ 385/106

(58) Field of Search ................................. 385/100, 147

(56) References Cited

U.S. PATENT DOCUMENTS

| 4,176,910 A | * | 12/1979 | Noethe .................... 385/106 |
| 4,331,379 A | * | 5/1982 | Oestreich et al. ........... 385/106 |
| 5,222,173 A | * | 6/1993 | Bausch .................... 385/106 |

* cited by examiner

*Primary Examiner*—Akm E. Ullah
(74) *Attorney, Agent, or Firm*—Sughrue Mion, PLLC

(57) ABSTRACT

In an optical cable with a cable core composed of a multiplicity of strand elements and an outer sheath layer, the strand elements have a multiplicity of bundles arranged loosely in a first sheath. The bundles are composed of a multiplicity of unstranded optical waveguides running parallel to each other, which are tightly encircled by a second closely thin-walled sheath.

16 Claims, 1 Drawing Sheet

OPTICAL CABLE

This application is based on and claims the benefit of German Patent Application No. 199 00 214.2 filed Jan. 7, 1999, which is incorporated by reference herein.

BACKGROUND OF THE INVENTION

The invention concerns an optical cable with a cable core composed of a multiplicity of strand elements and an outer sheath layer which envelops the cable core, and a method for its production.

It is known to equip optical waveguides with a plastic layer resistant to tensile and compression forces (fixed conductors) and to strand several such fixed conductors together or around a central element. In this construction, each optical waveguide is protected individually.

The cost in this case is very high and therefore a cable constructed in such manner is economical only if small numbers of fibers are required.

Furthermore, optical cables are known in which several optical waveguides are arranged loosely in a conductor sheath (bundle conductors) and several such bundle conductors are stranded around a central element. The optical waveguides lie in the conductor sheath with a certain excess length. The protection of the fibers in the conductor sheath is very good; however, such cable has the drawback that space utilization is not satisfactory.

A further known cable consists of several fiber bundles each of which is enveloped by a spiral. The spirals are colored differently. Several such fiber bundles are loosely encircled by a sheath. This construction is generally only selected in the case of cables with optical waveguides arranged in the center of the cable.

Such a cable allows high fiber counts (up to around 100 fibers are customary) in a sheath and requires only a small cabling expenditure. However, space utilization is also not optimal in this cable. In addition, because of necking resulting from spiral wrapping, the fibers easily react with attenuation. The identification of the fibers is often difficult because of the large pitch of the spirals.

In a further known cable, a multiplicity of optical waveguides are firmly encircled by a fiber sheath and several such fiber bundles are stranded together or around a central element. The cable core formed in such manner is encircled by a cable sheath. The advantage of this construction is its very good space utilization. A drawback is that only little mechanical protection of the fibers against radial pressure is available. Therefore, this cable is very sensitive with respect to increases in attenuation.

SUMMARY OF THE INVENTION

The object of the present invention is to provide an optical cable in which space utilization is optimized and the transverse forces are decoupled.

This object is achieved by the an optical cable with a cable core composed of a multiplicity of strand elements and an outer sheath layer which envelops the cable core, wherein the strand elements each comprise a multiplicity of bundles loosely arranged in a first sheath, and the bundles are composed of a multiplicity of unstranded optical waveguides running substantially parallel to each other which are tightly encircled by a thin-walled second sheath.

In addition to the advantages resulting directly from the definition of the problem, the cable as maintained by the invention also has the advantage that it is insensitive to increases in attenuation. The optical cable has a high fiber density with relatively small outside diameter. The invention basically resides in the fact that in a cable according to the bundle conductor principle, each optical waveguide is replaced by a fiber bundle composed of a multiplicity of optical waveguides. As a result, at approximately same outside cable diameter, the fiber count is higher by almost a power of ten than in the known bundle conductor cable. The "excess length" of the fibers arises as a result of the fact that the fiber bundles encircled by a sheath are arranged loosely in a mechanically stable sheath and can shift within the sheath in the event of the cable being bent.

In addition, an "excess length" occurs through the stranding of the strand elements. The fiber bundles are protected against transverse compressive stress forces in the mechanically stable sheath.

BRIEF DESCRIPTION OF THE DRAWING

The invention is explained in greater detail with reference to the accompanying drawings, wherein.

DETAILED DESCRIPTION OF THE INVENTION

Cable 1 is composed of a central element 8, for example fiberglass-reinforced plastic, polyaramide, metal or similar tensilely strong materials, around which several strand elements 2 are stranded. Strand elements 2 can be stranded with alternating direction of lay (SZ stranding). An outer sheath 3, e.g., of polyethylene, serves as external protection.

Figure 1:
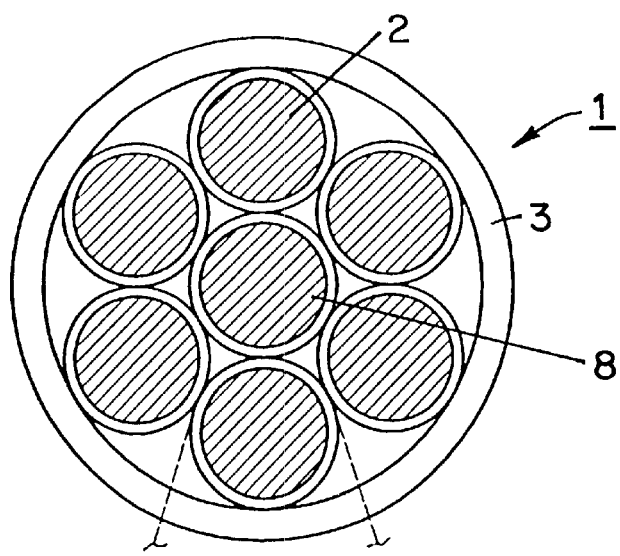
FIG. 1 schematically illustrates a section through a cable according to an exemplary embodiment of the invention.
Figure 2:
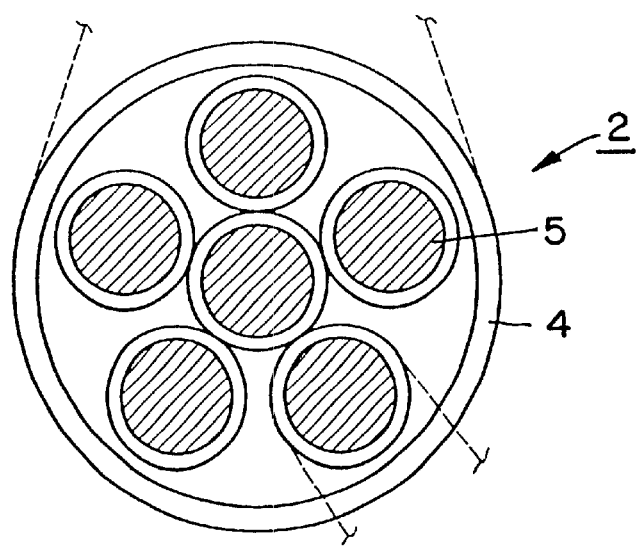
FIG. 2 illustrates a strand element in section.

In FIG. 2, a strand element 2 is depicted in section. Strand element 2 consists of several fiber bundles 5 which are loosely arranged within a sheath 4 either substantially parallel to each other or in undulations. The sheath 4 consists of a hard material which gives sheath 4 a high stability with respect to compressive force. Preferred materials for sheath 4 are hard polyethylene, polypropylene, polyester, etc. However, a small tube of metal is also suitable for sheath 4. Through the loose arrangement of fiber bundles 5 in sheath 4, it is ensured that fiber bundles 5 can shift against each other within sheath 4 in the case of a bend in cable 1. In this way, it is ensured that the individual fibers are not bent beyond an acceptable decree within fiber bundles 5. An appreciable damping is consequently not to be expected.

Figure 3:
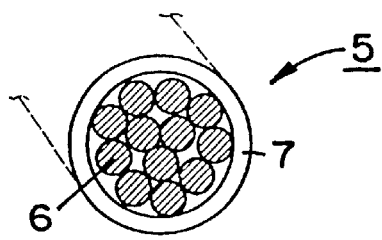
FIG. 3 shows a section through a fiber bundle.

FIG. 3 shows a section through a fiber bundle 5. Each fiber bundle 5 is composed of a sheath 7 within which a multiplicity of fibers and/or optical waveguides 6 are arranged. Sheath 7 tightly encircles the fiber bundle composed of the fibers and/or optical waveguides 6, so that at a given inside diameter of sheath 4, a maximum of six fibers 5 can be accommodated in sheath 4. The wall thickness of sheath 7 is very small, and for twelve fibers 6, by way of example, is less than 0.25 mm. Suitable materials for sheath 7 are soft materials, i.e., materials which can be easily removed if access to the fibers and/or optical waveguides 6 is required. Soft polyethylene, polyesteramide copolymer, soft ethylene propylene copolymer, styrene butadiene rubber, etc. are preferred.

A cable in accordance with the teaching of the invention can have the following dimensions by way of example:

| | |
|---|---|
| Outside diameter of the fiber and/or of the optical waveguide | 0.25 mm |
| Wall thickness of sheath 7 | 0.25 mm |
| With twelve fiber 6 tightly packed produces the outside diameter of fiber bundle 5 of | 1.5 mm |
| Wall thickness of sheath 4 (with plastic) | 0.6 mm |
| Approximate outside diameter of strand element 2 in the case of six fiber bundles 5 which are arranged loosely in sheath 4, by way of example | 6.2 mm |
| Wall thickness of cladding 3 | 1.5 mm |
| Approx. diameter of the cable according to the invention in the case of six strand elements 2 and a central member 8 with approximately equal diameters, for example | 21.5 mm |
| Approx. outside diameter for a fiber count of 432 | 21.5 mm |

During production of a cable according to the teaching of the invention, twelve fibers are drawn from a fiber supply, for example, spools are bundled in a nozzle and are enveloped with a thin-walled sheath by means of an extruder or bander. In the same process step or in a following process step, six of these fiber bundles are brought to an extruder and there are enveloped with a sheath of hard plastic.

Six of these strand elements are stranded around a central element and in the same or a following process step are provided with an outer sheath.

The fiber bundles and/or the strand elements can be filled with petroleum jelly. Sheaths 7 and sheaths 4 can be colored to make them more easily distinguished in the same manner as fibers 6.

In the interstices formed in cable 1 by strand elements 2, stranding units of smaller diameter can also be accommodated. In such manner, it is conceivable for fiber bundles 5 to be inserted into the six interstices, by which means the fiber count increases by 72.

What is claimed is:

1. An optical cable with a cable core composed of a multiplicity of strand elements and an outer sheath layer which envelops the cable core, wherein the strand elements each comprise a multiplicity of bundles loosely arranged in a first sheath, and the bundles are composed of a multiplicity of unstranded optical waveguides running substantially parallel to each other which are tightly encircled by a thin-walled second sheath.

2. An optical cable according to claim 1, wherein the wall thickness of the second sheath is no greater than 0.25 mm.

3. An optical cable according to claim 1, wherein the first sheath comprises a mechanically stable material.

4. An optical cable according to claim 1, wherein the first sheath comprises a thin-walled metal pipe.

5. An optical cable according to claim 1, wherein the first sheath is composed of a plastic tube on the basis of hard polyethylene or polypropylene which is stable with respect to transverse compression.

6. An optical cable according to claim 1, wherein the strand elements are stranded around a central element.

7. An optical cable according to claim 1, wherein the bundles are filled with a material preventing longitudinal migration of water.

8. An optical cable according to claim 1, wherein the strand elements are filled with a material preventing a longitudinal migration of water.

9. An optical cable according to claim 1, wherein the second sheath is composed of a soft, easily torn plastic.

10. A method for the production of an optical cable with a cable core composed of a multiplicity of strand elements and an outer sheath layer which envelops the cable core, wherein the strand elements each comprise a multiplicity of bundles loosely arranged in a first sheath, and the bundles are composed of a multiplicity of unstranded optical waveguides running substantially parallel to each other which are tightly encircled by a thin-walled second sheath, said method comprising the steps of:

in a first extruder, providing a sheath of plastic around bundled optical waveguides drawn from supply reels;

bringing said sheathed bundles to a cladding system substantially parallel to each other and there loosely encircling said sheathed bundles in a further sheath to form a plurality of elements;

stranding said elements; and applying an outer sheath to the stranded elements.

11. A method according to claim 10, wherein the bundles are provided with a sheath of a hard plastic.

12. A method according to claim 10, wherein the bundles are encircled with a metal pipe.

13. an optical cable according to claim 7, wherein said material comprises petroleum jelly.

14. An optical cable according to claim 9, wherein said easily torn plastic is soft polyethylene.

15. A method according to claim 10, wherein said elements are stranded together.

16. A method according to claim 10, wherein said elements are stranded around a central element.

* * * * *